(12) United States Patent
Pundak

(10) Patent No.: US 11,567,606 B1
(45) Date of Patent: Jan. 31, 2023

(54) TOUCH INPUT DETECTION USING COMPLEX GRADIENTS

(71) Applicant: Microsoft Technology Licensing, LLC, Redmond, WA (US)

(72) Inventor: Gilad Pundak, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/804,778

(22) Filed: May 31, 2022

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 3/04166* (2019.05)

(58) Field of Classification Search
CPC ... G06F 3/0418; G06F 3/04166; G06F 3/0446
See application file for complete search history.

(56) References Cited

U.S. PATENT DOCUMENTS

| | | | |
|---|---|---|---|
| 10,969,904 B2 | 4/2021 | Jiang | |
| 11,079,878 B1 | 8/2021 | Krah | |
| 11,157,116 B2 | 10/2021 | Kim et al. | |
| 2015/0062075 A1* | 3/2015 | Wakuda | G06F 3/04164 345/174 |
| 2020/0201468 A1 | 6/2020 | Park et al. | |
| 2021/0373711 A1 | 12/2021 | Smith et al. | |
| 2022/0057890 A1 | 2/2022 | Mohamed | |

FOREIGN PATENT DOCUMENTS

| | | |
|---|---|---|
| CN | 102073432 A | 5/2011 |
| WO | 2019185015 A1 | 10/2019 |

OTHER PUBLICATIONS

"Improve Conducted Noise Robustness for Touch Sensing Applications on MCUs", Retrieved from: https://www.st.com/resource/en/application_note/an4299-improve-conducted-noise-robustness-for-touch-sensing-applications-on-mcus-stmicroelectronics.pdf, Aug. 2021, 49 Pages.

* cited by examiner

*Primary Examiner* — Michael Pervan
(74) *Attorney, Agent, or Firm* — Alleman Hall Creasman & Tuttle LLP (57) ABSTRACT

A method for touch detection includes, at a touch-sensitive device having a plurality of touch-sensing electrodes, driving a first subset of the plurality of touch-sensing electrodes with a drive signal having a first phase. A second subset of the plurality of touch-sensing electrodes are driven with a drive signal having a second phase, different from the first phase. Output signals for each of the plurality of touch-sensing electrodes are measured. For each touch-sensing electrode of the plurality of touch-sensing electrodes, a complex gradient is determined between the measured output signal for the touch-sensing electrode and the measured output signal for a neighboring touch-sensing electrode, the neighboring touch-sensing electrode driven with a different phase of a drive signal from the touch-sensing electrode. A location of a touch input is identified based at least in part on magnitudes of the determined complex gradients.

20 Claims, 8 Drawing Sheets

```
┌─────────────────────────────────────────────────────────┐
│  DRIVE A FIRST SUBSET OF TOUCH-SENSING ELECTRODES WITH A │
│         DRIVE SIGNAL HAVING A FIRST PHASE                │
│                                                     302  │
└─────────────────────────────────────────────────────────┘
                            │
                            ▼
┌─────────────────────────────────────────────────────────┐
│ DRIVE A SECOND SUBSET OF TOUCH-SENSING ELECTRODES WITH A │
│         DRIVE SIGNAL HAVING A SECOND PHASE               │
│                                                     304  │
└─────────────────────────────────────────────────────────┘
                            │
                            ▼
┌─────────────────────────────────────────────────────────┐
│   MEASURE OUTPUT SIGNALS FOR EACH OF THE PLURALITY OF    │
│              TOUCH-SENSING ELECTRODES                    │
│                                                     306  │
└─────────────────────────────────────────────────────────┘
                            │
                            ▼
┌─────────────────────────────────────────────────────────┐
│ DETERMINE A COMPLEX GRADIENT BETWEEN THE MEASURED OUTPUT │
│ SIGNAL FOR EACH TOUCH-SENSING ELECTRODE AND THE MEASURED │
│   OUTPUT SIGNAL FOR A NEIGHBORING TOUCH-SENSING ELECTRODE│
│                                                     308  │
└─────────────────────────────────────────────────────────┘
                            │
                            ▼
┌─────────────────────────────────────────────────────────┐
│ IDENTIFY A LOCATION OF A TOUCH INPUT BASED AT LEAST IN PART│
│     ON MAGNITUDES OF THE CALCULATED COMPLEX GRADIENTS    │
│                                                     310  │
└─────────────────────────────────────────────────────────┘
```

TOUCH INPUT DETECTION USING COMPLEX GRADIENTS

BACKGROUND

A touch-sensitive device may include a plurality of touch-sensing electrodes configured to detect proximity of an input object, such as a stylus or human finger. In some cases, electrical noise affecting the touch-sensing electrodes can interfere with detection of touch inputs. Electrical noise can in some cases be caused by an electrical grounding condition affecting the touch-sensitive device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for touch detection includes, at a touch-sensitive device having a plurality of touch-sensing electrodes, driving a first subset of the plurality of touch-sensing electrodes with a drive signal having a first phase. A second subset of the plurality of touch-sensing electrodes are driven with a drive signal having a second phase, different from the first phase. Output signals for each of the plurality of touch-sensing electrodes are measured. For each touch-sensing electrode of the plurality of touch-sensing electrodes, a complex gradient is determined between the measured output signal for the touch-sensing electrode and the measured output signal for a neighboring touch-sensing electrode, the neighboring touch-sensing electrode driven with a different phase of the drive signal from the touch-sensing electrode. A location of a touch input is identified based at least in part on magnitudes of the determined complex gradients.

DETAILED DESCRIPTION

Touch-sensitive devices often operate in one of two electrical grounding states. In one state, the touch-sensitive device is grounded to earth ground—for instance, when the device is connected to a grounded power outlet, or when a conductive chassis of the device is held by a grounded human user. However, in another grounding state, the device may have its own arbitrary floating ground, independent from earth ground. As one example, this second grounding state can occur when the device is resting on a relatively non-conductive surface (e.g., a wooden table), and a user only touches poorly conducting display or touchpad glass.

This second grounding state can interfere with accurate detection of touch input. More particularly, instability of the device's reference ground can introduce electrical noise into signals output by touch-sensing electrodes. This can make it more difficult to quickly respond to a new touch input, or to distinguish multiple small inputs from a single larger input—e.g., distinguishing between multiple nearby fingertips or a single palm.

Accordingly, the present disclosure is directed to techniques for touch input detection that can beneficially improve the signal-to-noise ratio associated with detecting touch inputs, particularly in scenarios where the device has a floating ground. Specifically, for a touch-sensitive device having a plurality of touch-sensing electrodes, a first subset of the electrodes may be driven with a drive signal having a first phase, while a second subset is driven with a drive signal having a second phase, different from the first phase. As one example, the first and second drive signals can be identically shaped but completely out of phase—e.g., offset by 180°. Furthermore, complex gradients are determined between output signals measured from each of the plurality of touch-sensing electrodes. A location of a touch input may be identified based at least on magnitudes of the determined complex gradients. For instance, a cluster of electrodes associated with complex gradients having relatively high magnitudes may signify a touch at that location.

This may beneficially improve detection of touch inputs in scenarios where the touch-sensitive device has a floating ground, which may be particularly useful in cases where the touch-sensing electrodes are integrated into a self-capacitance touch sensor. However, it will be understood that the techniques described herein are not limited to particular electrical operating conditions of touch-sensitive devices, nor to specific types of touch-sensing electrodes. Rather, the techniques described herein may beneficially improve the signal-to-noise ratio associated with touch input detection across a wide range of electrical conditions, and in tandem with any suitable touch-sensing hardware. The techniques described herein may beneficially improve human-computer interaction and reduce the burden of user input to a computing device by improving the accuracy of touch input detection.

Figure 1:
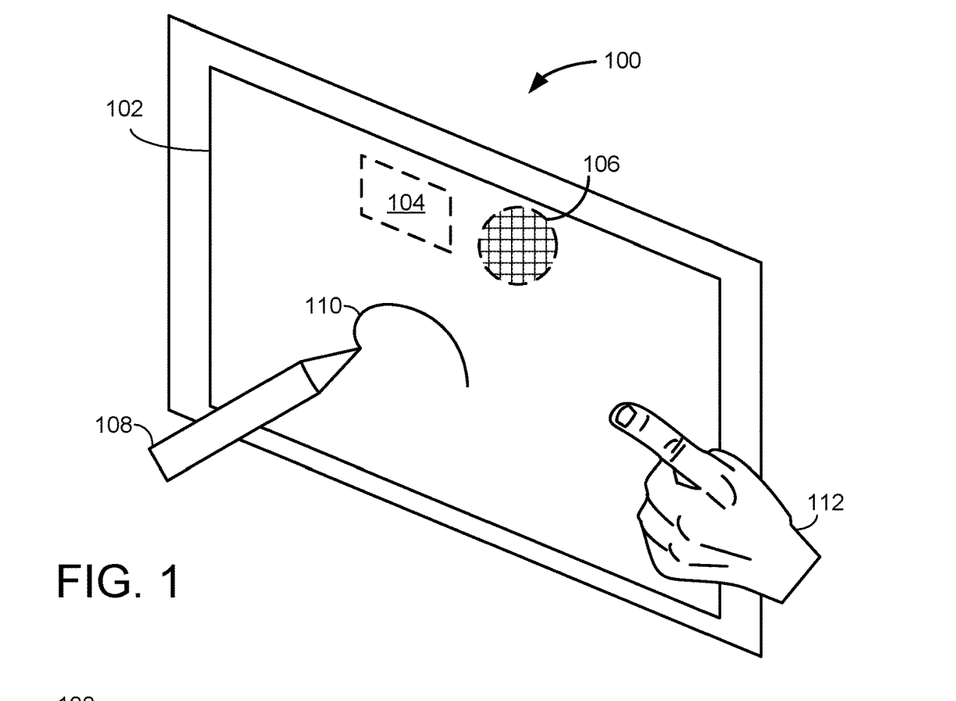
FIG. 1 schematically shows an example touch-sensitive device.

FIG. 1 schematically shows an example touch-sensitive device 100. In this example, the touch-sensitive device includes a touch-sensitive display 102. Both the touch-sensitive device 100 and touch-sensitive display 102 may have any suitable sizes and dimensions. In some examples, a touch-sensitive device may include more than one touch-sensitive display. For example, a touch-sensitive device as described herein may refer to a device having two or more touch-sensitive displays in a foldable or static configuration, as well as single-display devices such as touch-sensitive display device 100. As non-limiting examples, a touch-sensitive device may be implemented as, or be used in tandem with, a laptop computer, smartphone, tablet, computer monitor, fitness device (e.g., smartwatch), media center device, automotive computing device, etc. In some cases, a "touch-sensitive device" as described herein may be implemented as computing system 900 described below with respect to FIG. 9.

It will be understood that the techniques described herein are not limited to touch-sensitive devices including displays. Rather, the techniques described herein may be implemented in tandem with any suitable touch-sensitive input device, regardless of whether the input device is integrated into a display. For example, the touch input detection techniques can be used with a laptop trackpad, touch-sensitive controls on wireless headphones, a touch-sensitive input region disposed on the body of an active stylus, etc.

Furthermore, it will be understood that the devices and components depicted in FIG. 1 are simplified and schematic in nature. In practical examples, "touch-sensitive devices" may include additional or alternative components to those described herein; may have any suitable shapes, sizes, and form factors; and may have any suitable capabilities.

Touch-sensitive device 100 includes a touch controller 104 configured to perform one or more of the computing functions described herein. For example, as will be described in more detail below, touch controller 104 may be configured to drive touch-sensing electrodes with drive signals having different phases, and identify locations of touch inputs based at least on determined complex gradients. In some examples, the controller may include one or more computer processors, or other suitable logic hardware, working in tandem with one or more volatile or non-volatile data storage devices, or other suitable storage hardware. In some examples, controller 104 may be implemented via logic subsystem 902 and storage subsystem 904 described below with respect to FIG. 9.

Touch-sensitive display 102 includes a plurality of touch-sensing electrodes, including electrodes 106, which may be configured to detect proximity of input objects to the touch-sensitive display. As discussed above, touch-sensing electrodes may in some cases be used independently of a display device. Input objects may include, as examples, human fingers, passive styluses, active styluses, and other suitable electronic devices or non-electronic objects. The touch-sensing electrodes may detect proximity of an input object in various different ways depending on the implementation. In general, proximity of an input object to the touch-sensitive device (e.g., directly contacting the device, or hovering above the device) may affect electrical conditions at the touch-sensing electrodes in a measurable way. By monitoring electrical conditions at the plurality of touch-sensing electrodes, controller 104 may determine the two-dimensional position of the touch input relative to the surface of the device—e.g., relative to the display surface. Touch-sensing electrodes 106 and controller 104 are shown with dashed lines to indicate that they are disposed within the device and thus would not ordinarily be visible from the illustrated perspective.

In FIG. 1, a stylus 108 is in proximity to the surface of touch-sensitive display 102. The stylus may, for example, take the form of an active stylus that includes an internal power supply and internal logic components configured to transmit electrical signals that are detectable by the touch-sensitive display device. Proximity of the active stylus to the surface of the touch-sensitive display is detected by the display device as a touch input, resolvable to a particular location relative to the display surface. This location may be provided to an operating system and/or one or more software applications of the touch-sensitive display device as an input that controls or changes behavior of the display device. It will be understood that "proximity" of an active stylus to a display surface may include either or both of direct contact between the stylus and display surface, and "hovering" of the stylus at a position near (e.g., within several centimeters of) the display surface.

In the example of FIG. 1, the stylus includes a pointed tip that is making contact with the surface of the touch-sensitive display. For example, the stylus tip may include an internal conductive electrode that is configured to electrostatically interact with touch-sensing electrodes of the display device. It will be understood, however, that stylus 108 is non-limiting, and that the techniques described herein may be applied to styluses (and/or other suitable electronic devices) having any suitable configurations and structures. For example, each end of the active stylus may have any suitable shape (e.g., pointed, rounded, flat, wedge-shaped), and the active stylus may include any number of different electrodes having any suitable positions within the body of the active stylus.

In FIG. 1, the touch-sensitive display device is graphically rendering the touch input as a line 110 that reflects detected movements of the active stylus relative to the display surface over time. It will be understood that line 110 is only included for the sake of illustration, and that a touch-sensitive device as described herein need not graphically render detected touch inputs.

FIG. 1 also shows a human hand 112 in proximity to the surface of the touch-sensitive display. As discussed above, the touch-sensing electrodes of the touch-sensing display may be affected by proximity of any variety of different types of input objects to the display surface. In some cases, different types of input objects may be distinguished from one another based at least on the manner in which they influence electrical conditions at the touch-sensing electrodes. For example, some types of input objects (such as human hands and passive styluses) may passively influence capacitance at the touch-sensing electrodes, while other types of input objects (e.g., active styluses) may actively transmit signals that enable them to be uniquely distinguished from other input objects. Thus, for instance, touch-sensitive display device may be configured to differentiate between active stylus 108 and human hand 112, and respond to touch inputs provided by these input objects in different ways.

In general, touch-sensing electrodes of the touch-sensitive device may be driven with a drive signal to facilitate touch input detection and/or communication with a separate active stylus. For example, a drive signal supplied to transmit electrodes may be detectable at corresponding receivers, where observed changes in the signal may be caused by proximity of an input object. Additionally, or alternatively, the drive signal may be modulated to encode data to be communicated to a separate device, such as a stylus.

Figure 2:
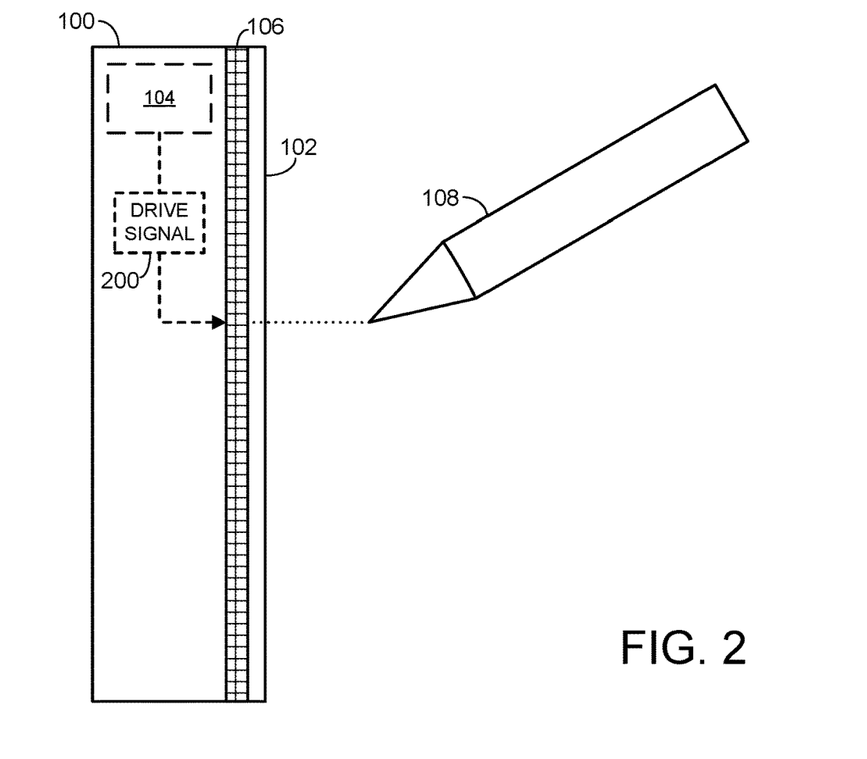
FIG. 2 schematically illustrates driving of a plurality of touch-sensing electrodes with a drive signal.

This is schematically illustrated with respect to FIG. 2. Specifically, FIG. 2 again shows touch-sensitive device 100, but this time as a pseudo-cross-section that shows active stylus 108 spaced away from touch-sensitive display 102, and touch-sensing electrodes 106 disposed beneath the display surface. As with FIG. 1, it will be understood that the specific arrangement of components shown in FIG. 2 (as well as other figures described herein) is non-limiting, highly simplified, and schematic in nature. In general, a touch-sensitive device may have additional or alternative components to those described herein, and such components may be arranged in any suitable configuration.

In FIG. 2, the tip of active stylus 108 is shown as being spaced away from the surface of touch-sensitive display 102. However, this is primarily done for the sake of visual clarity. As discussed above, the touch-sensitive display device may detect a touch input based at least on proximity of an input object to the display surface, where "proximity" can refer to scenarios where the input object is spaced away from the display surface, and/or scenarios where the input object is directly contacting the display surface.

In FIG. 2, controller 104 is driving touch-sensing electrodes 106 with a drive signal 200. The drive signal may take any suitable form. As discussed above, the drive signal may in some cases facilitate touch input detection—e.g., a drive signal detected at a receive electrode may be compared to the original drive signal supplied to a transmit electrode, and the touch controller may use any observed changes in the signal to detect proximity of an input object. Additionally, or alternatively, the drive signal may encode computer data to be communicated to the active stylus. For instance, by driving the touch-sensing electrodes with the drive signal, the touch-sensitive display device may influence electrical conditions in a manner that is detectable by active stylus 108—e.g., enabling the active stylus to receive and decode the computer data encoded by the drive signal.

However, as discussed above, certain electrical grounding conditions affecting the touch-sensitive device can interfere with detection of touch inputs by the touch controller. For instance, when the touch-sensing device has a floating ground, instabilities in the system's reference ground can cause electrical noise in the signals output by the touch-sensing electrodes, making it relatively more difficult to distinguish a user's finger or palm inputs.

Figure 3:
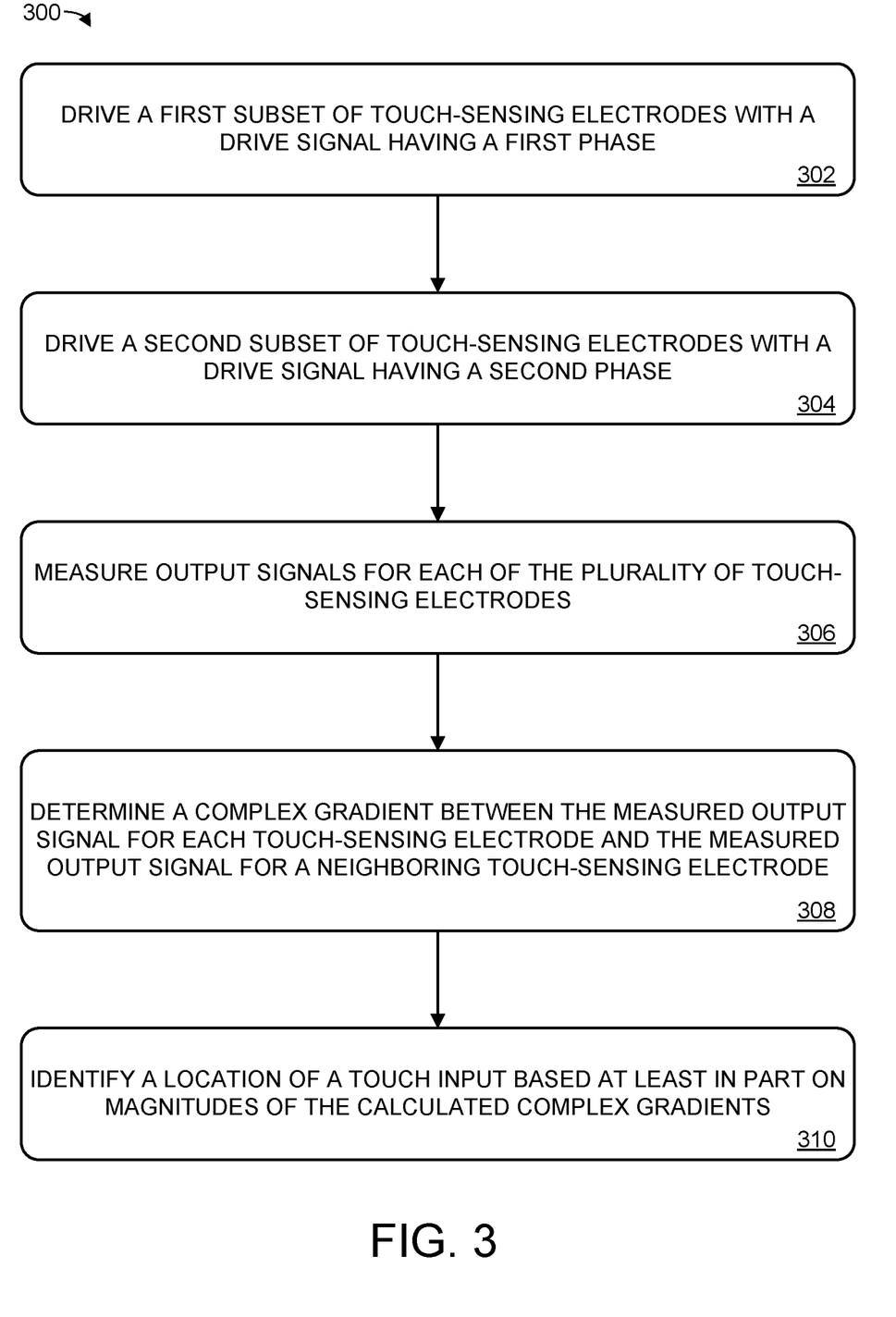
FIG. 3 illustrates an example method for touch input detection.

Accordingly, FIG. 3 illustrates an example method 300 for touch input detection. Method 300 is primarily described from the perspective of a touch controller of a touch-sensitive device. However, it will be understood that any or all steps of method 300 may be implemented by any suitable computing system of one or more computing devices that includes or otherwise controls a suitable touch-sensitive input device. Any device performing steps of method 300 may have any suitable capabilities, hardware configuration, and form factor. In some cases, method 300 may be implemented by computing system 900 described below with respect to FIG. 9.

At 302, method 300 includes, at a touch-sensitive device having a plurality of touch-sensing electrodes, driving a first subset of the plurality of touch-sensing electrodes with a drive signal having a first phase. Furthermore, at 304, method 300 includes driving a second subset of the plurality of touch-sensing electrodes with a drive signal having a second phase, different from the first phase. As one example, the second phase may be offset from the first phase by 180°. In other words, substantially the same drive signal may be applied to the first and second subsets of touch-sensing electrodes (e.g., the same pattern of on-pulses and off-pulses), albeit offset temporally.

Figure 4A:
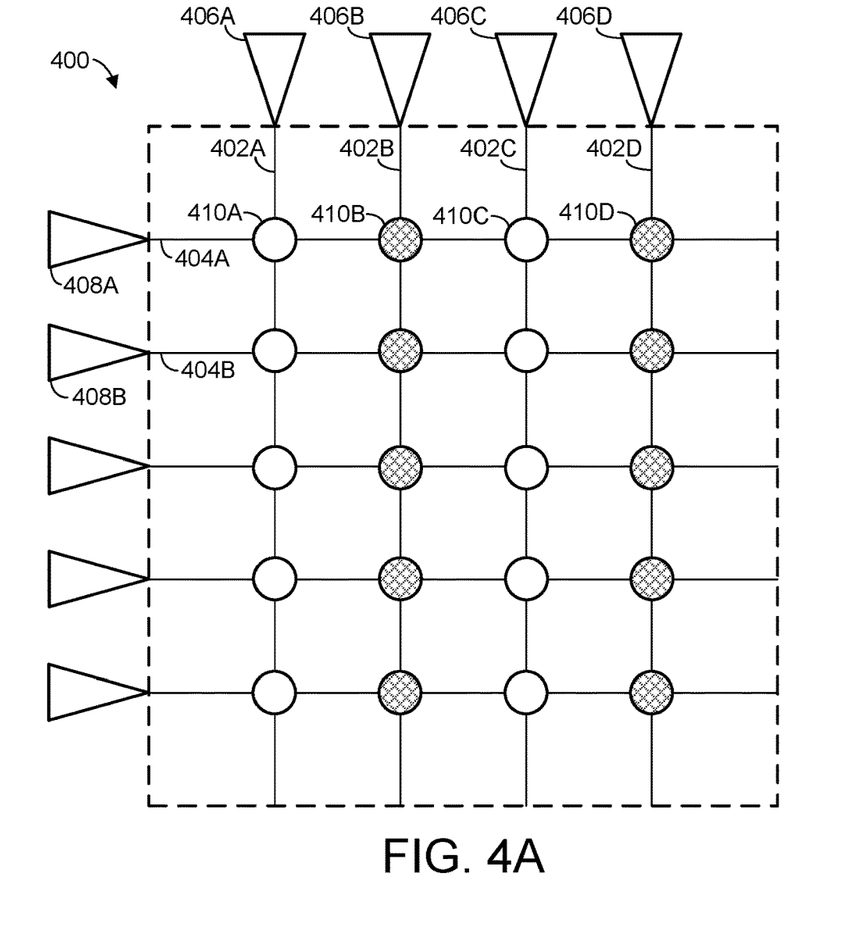
FIGS. 4A and 4B schematically illustrate driving subsets of a plurality of touch-sensing electrodes with a drive signal having different phases.
Figure 4B:
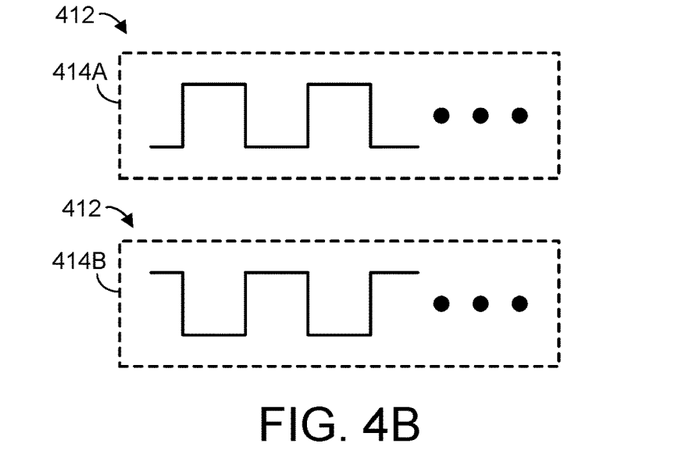

This is illustrated with respect to FIGS. 4A and 4B. Specifically, FIG. 4A schematically shows an example plurality of touch-sensing electrodes 400. In some cases, touch-sensing electrodes 400 may be integrated into a touch-sensitive display (e.g., as is shown in FIG. 1), or the touch-sensing electrodes may be integrated into any other suitable touch-sensitive input device that does not include a display.

In the example of FIG. 4, the plurality of touch-sensing electrodes are arranged in a two-dimensional electrode grid. Specifically, the touch-sensing electrodes include several column electrodes (e.g., column electrodes 402A-D) that cross several row electrodes (two of which are labeled as row electrodes 404A and 404B). A touch-sensitive device as described herein may include any number N of row electrodes and any number M of column electrodes. Although it is customary to have the row electrodes aligned horizontally and the column electrodes aligned vertically, that aspect is in no way necessary, as the terms 'row' and 'column' may be exchanged everywhere in this description.

As one example, the row electrodes can be arranged on one face of a dielectric layer, and the column electrodes can be arranged on the opposite face of the dielectric layer. The dielectric layer may be 50 to 100 µm in some examples, although other thickness ranges are also envisaged. The dielectric layer may comprise a polymer film, such as polyethylene terephthalate (PET). In curved, flexible and/or bendable touch-screen systems, the dielectric layer may be curved, flexible and/or bendable. The row electrodes and column electrodes may each comprise electronically conductive material distributed in the form of narrow (e.g., one mm-wide), elongate bands on the opposite faces of the dielectric layer. Adjacent electrodes may be separated by one to five millimeters in some examples. The composition of the electronically conductive material is not particularly limited. The electronically conductive material may comprise a metallic microwire mesh, a metal-particle or metal-island film, or a film of a degenerately doped semiconductor, such as indium-tin oxide (ITO), for instance.

In the illustrated example, the column electrodes are communicatively coupled to respective column controllers, where each controller is configured to drive its associated column electrode with a drive signal. As shown, column electrode 402A is coupled to controller 406A, column electrode 402B is coupled to controller 402B, and so on. The column controllers may also be referred to as "drivers," configured to supply a drive signal to the column electrodes. Application of a drive signal to the column electrodes may facilitate touch input detection in various ways depending on the specific touch-sensing technology used by the touch-sensitive device.

For example, when the plurality of touch-sensing electrodes is integrated into a self-capacitance touch sensor, proximity of an input object to a touch-sensing electrode causes capacitive coupling between the input object and electrode, and this may increase the effective current draw by the electrode (e.g., as some current flows from the electrode to the input object). Thus, the horizontal coordinate (e.g., X axis coordinate) of a touch input may be determined based at least on which row electrodes exhibit changes in current draw. The vertical coordinate (e.g., Y axis coordinate) may be determined based at least on similar changes in current draw by the row electrodes, also coupled to respective controllers (e.g., row electrode 404A is coupled to controller 408A, and row electrode 404B is coupled to controller 408B). The intersections between row and column electrodes are labeled as nodes 410—e.g., node 410A is the intersection between column electrode 402A and row electrode 404A. By detecting changes in the drive signals (e.g., increases in current draw) supplied to the row and column electrodes, proximity of an input object may be localized to a touch input position overlapping one or more of the nodes.

As another example, the plurality of touch-sensing electrodes may be integrated into a mutual capacitance touch sensor. In such cases, a drive signal applied to the column electrodes may be detected at receivers coupled to the row electrodes (or vice versa). Thus, in the illustrated example, the row controllers 408 may take the form of receivers, each configured to detect the drive signal applied to the column electrodes. The electrical impedance at each node 410 may be responsive to the proximity of a finger or stylus to that node—e.g., when the user places a fingertip on the sensory surface, the fingertip capacitively couples one or more row electrodes proximate to (e.g., crossing) the touch point to one or more column electrodes also proximate to the touch point. The capacitive coupling induces an above-threshold signal from the row receivers coupled to the rows that are proximate to the touch point. In this manner, the vertical coordinate (e.g., Y axis coordinate) of the touch input can be determined by identifying which of the row receivers detect an above-threshold signal. The horizontal coordinate (e.g., X axis coordinate) can be determined by applying the drive signals to the column electrodes on different time frames, and determining which column electrode(s) were driven on a time frame at which the greatest change in signal was observed at the row electrode receivers.

Though the present disclosure primarily focuses on scenarios where the touch-sensing electrodes take the form of perpendicular row and column electrodes arranged in a two-dimensional grid, it will be understood that this is non-limiting, and that other arrangements of touch-sensing electrodes are contemplated. As another example, the plurality of electrodes may take the form of a plurality of individual capacitive pads having any suitable spatial arrangement, rather than the electrodes taking the form of separate rows and columns.

Regardless of the specific touch-sensing technology used, it may in some cases be beneficial to drive different subsets of the touch-sensing electrodes with different phases. In the example of FIG. 4A, a first subset of touch-sensing electrodes includes column electrode 402A and column electrode 402C. These electrodes are driven with a first phase of a drive signal, as indicated by the white circles shown at the column-row nodes along column electrodes 402A and 402C. A second subset of the plurality of touch-sensing electrodes includes column electrodes 402B and 402D. These electrodes are driven by a second phase of a drive signal, as indicated by the fill pattern used for the circles shown at the column-row nodes along column electrodes 402B and 402D.

In other words, in the example of FIG. 4A, the first subset of the plurality of touch-sensing electrodes is interleaved with the second plurality of touch-sensing electrodes. Specifically, the first subset of the plurality of touch-sensing electrodes is interleaved with the second subset of the plurality of touch-sensing electrodes such that, for a column electrode of the two-dimensional electrode grid driven with the drive signal having the first phase, one or more neighboring column electrodes to the column electrode are driven with the drive signal having the second phase. For example, column electrode 402C is driven with the drive signal having the first phase, while neighboring column electrodes 402B and 402D are driven with the drive signal having the second phase.

As will be described in more detail below, driving neighboring touch-sensing electrodes with opposite phases of a drive signal may provide a technical benefit of improving the signal-to-noise ratio of touch input detection. This is because the measured output signals for the neighboring touch-sensing electrodes will include complex numbers having opposite phases, and subtracting such numbers will result in a complex number having a relatively higher magnitude, making it easier to distinguish electrodes detecting touch from electrodes only detecting noise.

It will be understood that this interleaving pattern is not limiting. In examples where drive signals are applied to row electrodes, a similar interleaving pattern may be used—e.g., a row electrode may be driven with a different phase of the drive signal from one or more of its neighboring row electrodes. Such row-by-row interleaving may be used in addition to, or instead of, column-by-column interleaving such as is shown in FIG. 4A. Furthermore, it will be understood that various suitable interleaving patterns may be used even in scenarios where the touch-sensing electrodes are not implemented as intersecting row and column electrodes. For example, in a case where the individual touch-sensing electrodes are implemented as separate capacitive pads, each individual pad may be supplied with a drive signal having a different phase from its orthogonal neighbor.

The first and second phases of the drive signal may have any suitable relationship with respect to one another. As discussed above, the first and second phases of the drive signal may in some cases be 180° offset and/or completely out of phase. This is illustrated with respect to FIG. 4B, showing a simplified representation of an example drive signal 412. The drive signal is shown with two different phases—a first phase 414A that begins with an off-pulse, and a second phase 414B that begins with an on-pulse. As shown, the two phases are completely out of phase relative to one another, such that each on-pulse in first phase 414A is matched by an equivalent off-pulse in second phase 414B, and vice versa.

It will be understood that the techniques described herein need not be limited to scenarios where the two phases of the drive signal are 180° offset from one another. Rather, in other implementations, other suitable phase offsets may be used. Furthermore, in some cases, the touch-sensing electrodes may be divided into more than two different subsets, and the different subsets may be driven with more than two different phases of a drive signal. However, it is believed that using two phases of the drive signal that are completely out of phase can beneficially improve the performance of the touch-sensing device, as current coupled into a human hand from one touch-sensing electrode may be offset by an opposite phase current coupled into the human hand from a neighboring touch-sensing electrode. This can reduce instability in the reference ground used by the touch-sensing device in floating ground scenarios, particularly when a self-capacitance touch sensor is used.

Returning briefly to FIG. 3, at 306, method 300 includes measuring output signals for each of the plurality of touch-sensing electrodes. The specific form that the output signals take, as well as the specific manner in which they are measured, will vary depending on the specific manner in which the touch-sensing electrodes and the receiving hardware are implemented. For example, when the touch-sensing electrodes are implemented as part of a self-capacitance touch sensor, the measured output signals may include the total amount of current drawn by each touch-sensing electrode while the drive signal is applied, as this current draw may change due to capacitive coupling with a nearby input object. When the touch-sensing electrodes are implemented as part of a mutual-capacitance touch sensor, the output signals may be measured from a receiver configured to detect a drive signal applied to a different electrode—e.g., the drive signal may be applied to a column electrode and detected at a receiver coupled to a row electrode. Proximity of an input object to a row-to-column node may affect the mutual capacitance between the row and column electrodes, resulting in a higher signal being measured at the receiver.

Returning to FIG. 3, at 308, method 300 includes, for each touch-sensing electrode of the plurality of touch-sensing electrodes, determining a complex gradient between the measured output signal for the touch-sensing electrode and the measured output signal for a neighboring touch-sensing electrode. The complex gradient may be determined in any suitable way—e.g., via a suitable algorithm for calculating complex gradients. In some cases, determining the complex gradient may include applying a discrete Fourier transform to measured output signals for the touch-sensing electrodes, and calculating the complex gradient between the transform results. Additionally, or alternatively, the complex gradient may be determined in other suitable ways—e.g., by retrieving the complex gradient from a suitable lookup table or other data structure based at least on the measured output signals.

Figure 5:
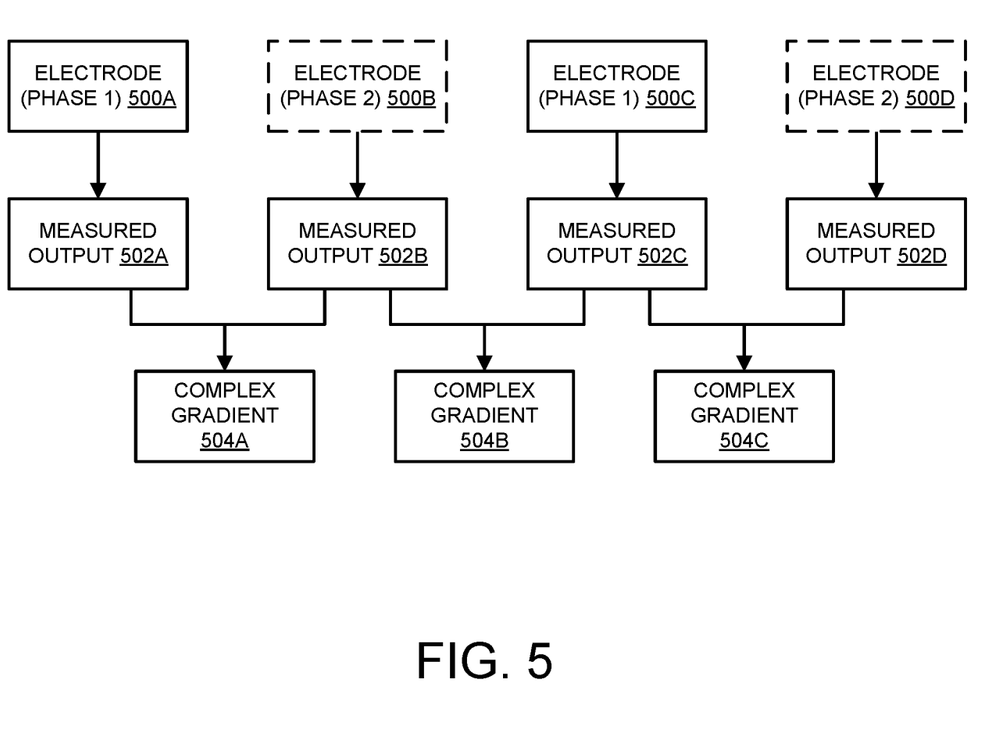
FIG. 5 schematically illustrates determining complex gradients based at least on output signals measured from touch-sensing electrodes.

As discussed above, the neighboring touch-sensing electrode may be driven with a different phase of the drive signal—e.g., one electrode is driven with a first phase of the drive signal, while a neighboring electrode is measured with a second phase of the drive signal. This is illustrated with respect to FIG. 5, schematically representing four different touch-sensing electrodes 500A-500D. Electrodes 500A and 500C are driven with the first phase of the drive signal, while electrodes 500B and 500D are driven with the second phase of the drive signal. The touch controller measures output signals 502A-D for each of the electrodes, then determines complex gradients between the measured output signals. Specifically, a complex gradient 504A is determined between output signals 502A and 502B, while complex gradient 504B is determined between output signals 502B and 502C, and complex gradient 504C is determined between output signals 502C and 502D.

It will be understood that the specific method used to determine a complex gradient may vary depending on the implementation and the specific form of the measured output signals. As one example, determining the complex gradients may include applying a Discrete Fourier Transform (DFT) to each of the measured output signals and, and for each touch-sensing electrode of the plurality of touch-sensing electrodes, determining the complex gradient between DFT results for the touch-sensing electrode and the neighboring touch-sensing electrode. As a result of applying the DFT to the measured output signals, the touch controller may generate an array of N complex DFT results for each electrode E—e.g., each cell in the array holds a complex value with a real part (R) and an imaginary part (j) for each electrode:

$$[E0_R + j*E0_j, E1_R + j*E1_j, \ldots E(N-1)_R + j*E(N-1)_j]$$

The touch controller may determine the complex gradients based at least in part on these DFT results. As one example, the complex gradient between the measured output signals for any two neighboring electrodes may be determined as follows:

$$[(E0_R - E1_R) + j*(E0_j - E1_j)]$$

The touch controller may then determine the magnitude of each complex gradient as follows:

$$\left[ \sqrt{E0_R^2 + E0_j^2}, \sqrt{E1_R^2 + E1_j^2}, \ldots \sqrt{E(N-1)_R^2 + E(N-1)_j^2} \right]$$

It will be understood that the above approach is one non-limiting example. In general, a touch controller may determine complex gradients between measured output signals for various touch-sensing electrodes in any suitable way.

Returning briefly to FIG. 3, at 310, method 300 includes identifying a location of a touch input relative to the plurality of touch-sensing electrodes based at least in part on magnitudes of the determined complex gradients. As one example, identifying the location of the touch input may include identifying a cluster of touch-sensing electrodes of the plurality of touch-sensing electrodes for which the magnitudes of the complex gradients determined for the touch-sensing electrodes are greater than a touch input threshold.

Figure 6A:
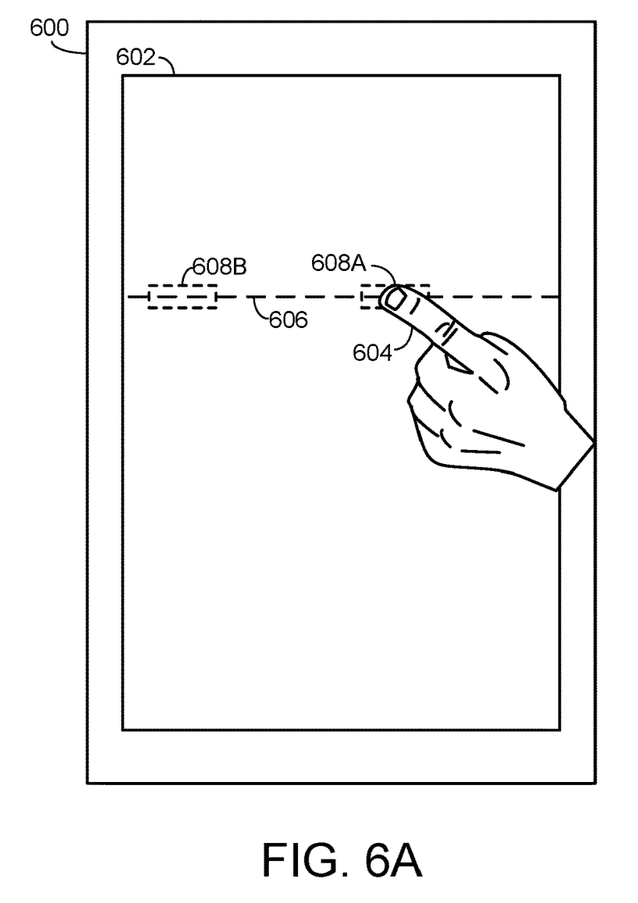
FIGS. 6A and 6B schematically illustrate identifying a location of a touch input based at least on magnitudes of determined complex gradients.
Figure 6B:
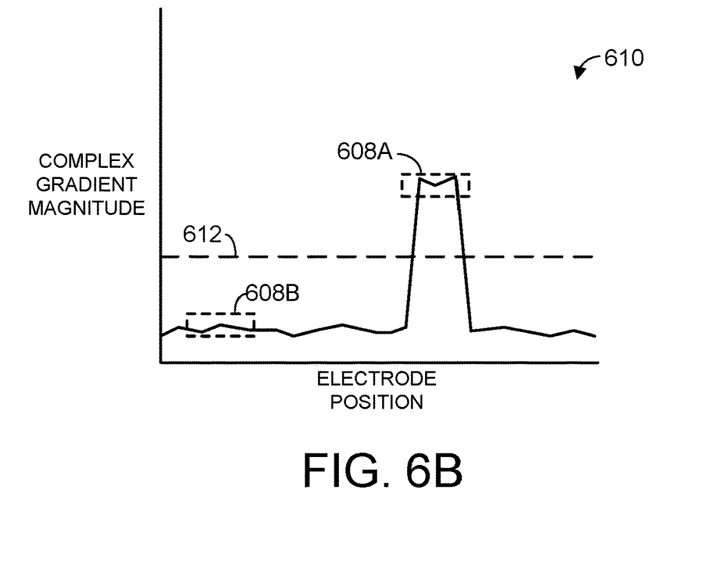

This is schematically illustrated with respect to FIGS. 6A and 6B. Specifically, FIG. 6A schematically shows an example touch-sensing device 600 that includes a touch-sensitive display 602. A human hand 604 is providing touch input to the surface of the touch-sensitive display, which may include a plurality of touch-sensing electrodes as discussed above. As with touch-sensing device 100, it will be understood that touch-sensing device 600 is highly simplified and provided only as a non-limiting example.

In FIG. 6A, the user's touch input falls along a reference line 606. As one example, the reference line may correspond to a row electrode of the plurality of touch-sensing electrodes, which is crossed by a plurality of different column electrodes as is shown in FIG. 4A. Neighboring column electrodes along the row electrode may each be driven with different phases of the drive signal. A touch controller may measure output signals corresponding to each of these column electrodes, then determine complex gradients between the output signals for each neighboring column electrode. Proximity of the human finger may contribute to a difference between the magnitudes of the complex gradients determined for a first region of interest 608A centered on the location of interest, as compared to the magnitudes of the complex gradients determined for a second region of interest 608B, which is relatively further away from the position of the touch input.

This is illustrated with respect to FIG. 6B, which shows a plot 610 that relates the positions of the column electrodes along reference line 606 to the magnitudes of the complex gradients determined for the column electrodes. As shown, the complex gradients determined for the electrodes near the location of the touch input (e.g., within region of interest 608A) have relatively high magnitudes, while the complex gradients determined for the electrodes away from the location of the touch input (e.g., within region of interest 608B) have relatively lower magnitudes.

Plot 610 further shows a touch input threshold 612, which may be used to distinguish which electrodes are currently detecting touch input. In other words, electrodes for which the magnitude of the complex gradient is less than the threshold may be determined not to be detecting touch input. Electrodes for which the magnitude of the complex gradient is greater than the threshold may be determined to be detecting touch input—e.g., the touch input is localized to the positions of those electrodes. It will be understood that the touch input threshold may have any suitable value depending on the implementation. In some cases, the value of the touch input threshold may be tuned to balance the sensitivity of the touch-sensitive device against the risk of increasing false positive detections.

As discussed above, driving neighboring touch-sensing electrodes with drive signals that are completely out of phase can improve the signal-to-noise ratio of touch input detection. This is because the measured output signals for the neighboring touch-sensing electrodes will include complex numbers having opposite phases, and subtracting such numbers will result in a complex number having a relatively higher magnitude. By contrast, subtracting complex numbers having the same phase (e.g., because the neighboring touch-sensing electrodes are driven with the same phase of the drive signal), will result in a complex number having a relatively smaller magnitude (e.g., closer to zero).

Figure 7A:
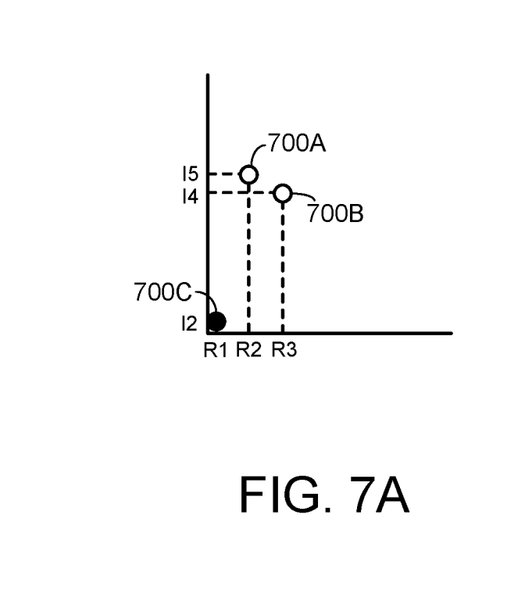
FIGS. 7A and 7B illustrate comparing measured output signals from neighboring touch-sensing electrodes.
Figure 7B:
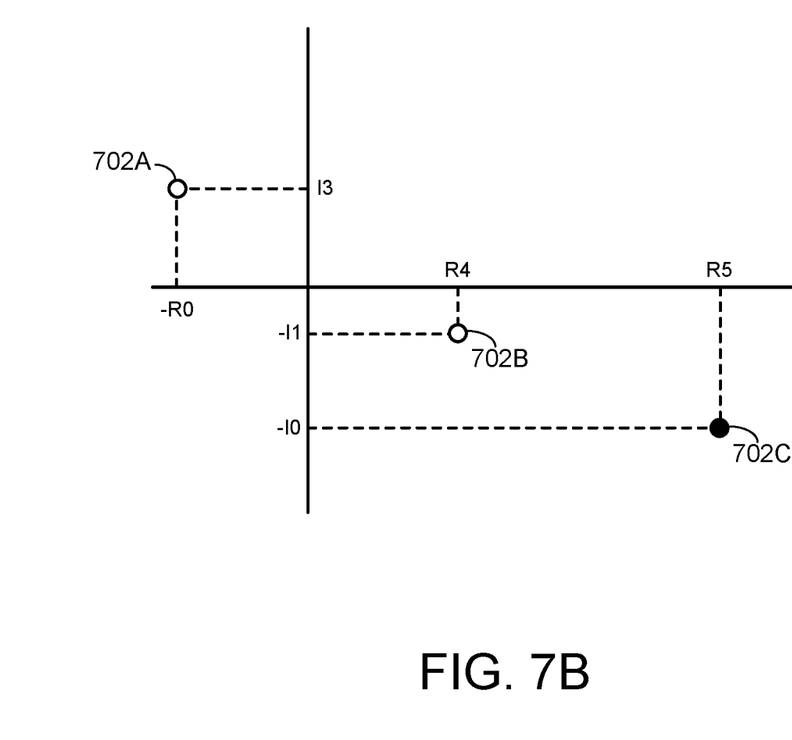

This is illustrated with respect to FIGS. 7A and 7B. FIG. 7A illustrates measured output signals 700A and 700B, corresponding to two neighboring touch-sensing electrodes that are driven with the same phase of the drive signal. The measured output signals are subtracted to give a result 700C that is close to zero. Specifically:

Electrode 1(700A)=R2+j*I5

Electrode 2(700B)=R3+j*I4

Result(700C)=(R2−R3)+j*(I5−I4)=R1+j*I2

By contrast, FIG. 7B illustrates measured output signals 702A and 702B, corresponding to neighboring touch-sensing electrodes that are driven with opposite phases of the drive signal. The measured output signals are subtracted to give a result 702C having a much higher magnitude than result 700C of FIG. 7A. Specifically:

Electrode 1(702A)=R4−j*I1

Electrode 2(702B)=−R0+j*I3

Result(702C)=(R4+R0)−j*(I1−I3)=R5−j*I0

In some cases, the touch controller may further perform one or more background noise correction steps to further improve the touch detection performance of the touch-sensitive device. This may include identifying a free touch-sensing electrode of the plurality of touch-sensing electrodes not currently affected by proximity of an input object, and estimating an electrical noise affecting the plurality of touch-sensing electrodes based at least on a measured output signal for the free touch-sensing electrode.

It will be understood that an electrode may be "not currently affected" by proximity of an input object if less than a threshold percentage (e.g., 10%) of the signal reported by the electrode is caused by proximity of an input object, and "free electrodes" therefore need not exclusively include electrodes that are completely unaffected by any or all potential nearby sources of touch input. By measuring an electrical noise detected at a free touch-sensing electrode, then subtracting the measured electrical noise from readings output by a plurality of occupied touch-sensing electrodes (e.g., touch-sensing electrodes currently detecting proximity of an input object), the touch-sensitive display device may more consistently and accurately detect the position of a touch input relative to the touch-sensing electrodes.

A free touch-sensing electrode may be identified in any suitable way. As one example, the free touch-sensing electrode may be identified based at least on a complex gradient determined for the free touch-sensing electrode being less than the touch input threshold. For instance, column electrodes corresponding to the second region of interest 608B of FIGS. 6A and 6B may be identified as free touch-sensing electrodes. In some cases, free touch-sensing electrodes may be identified based at least on observation over time. For example, the touch controller may aggregate signals measured for each of the plurality of touch-sensing electrodes over a plurality of time frames to estimate baseline signals for each of the touch-sensing electrodes when no touch input is detected. In this manner, the touch controller may identify free touch-sensing electrodes as those that are outputting signals consistent with the previously observed baselines.

Figure 8:
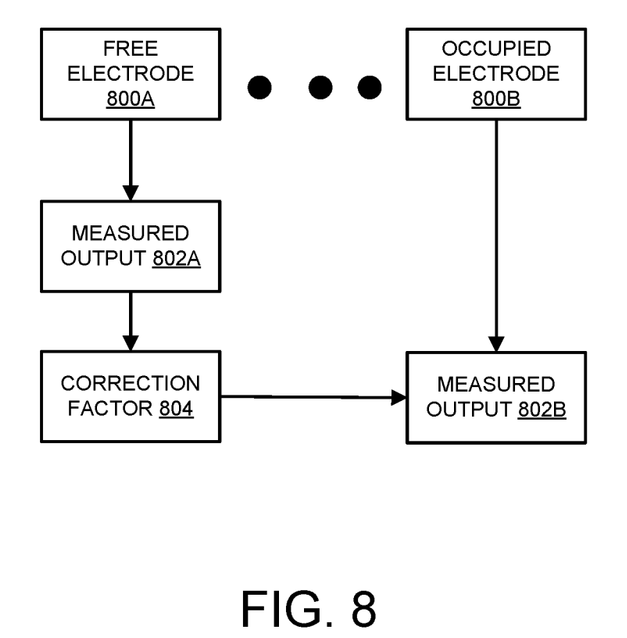
FIG. 8 schematically illustrates applying a background noise correction factor to measured output signals.

Upon identifying a free touch-sensing electrode, the touch controller may apply a background noise correction factor to measured output signals for one or more touch-sensing electrodes corresponding to the location of the touch input (e.g., occupied touch-sensing electrodes). This process is illustrated with respect to FIG. 8, schematically showing an example free touch-sensing electrode 800A and an example occupied touch-sensing electrode 800B. The touch controller measures output signals 802A and 802B from electrodes 800A and 800B as described above. Based at least on the measured output signal 802A corresponding to electrode 800A, the touch controller derives a background noise correction factor 804 and applies it to the measured output signals 802B for occupied electrode 800B. In this manner, the touch controller may mitigate the effects of background noise on touch input detection.

It will be understood that the background noise correction factor may be derived and applied in any suitable way. In some cases, the background noise correction factor may take the form of the signal output by the free touch-sensing electrode on a previous time frame, and this signal may be subtracted from the measured output signal for the occupied touch-sensing electrode. As another example, the background noise correction factor may include an average or aggregation of measured signals output by the free touch-sensing electrode on multiple previous time frames—e.g., the background noise correction factor may correspond to a baseline observed electrical noise as described above. As another example, the background noise correction factor may include an average or aggregation of signals output by two or more free touch-sensing electrodes on one or more previous time frames. For example, the background noise correction factor may be an average of all output signals measured for touch-sensing electrodes associated with complex gradients having magnitudes below the touch input threshold.

Furthermore, it will be understood that such background noise correction may occur at any suitable point during the touch detection process. For example, background noise correction may in some cases occur prior to calculation of the complex gradients for each touch-sensing electrode—e.g., prior to application of the DFT to the measured output signals for each touch-sensing electrode.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
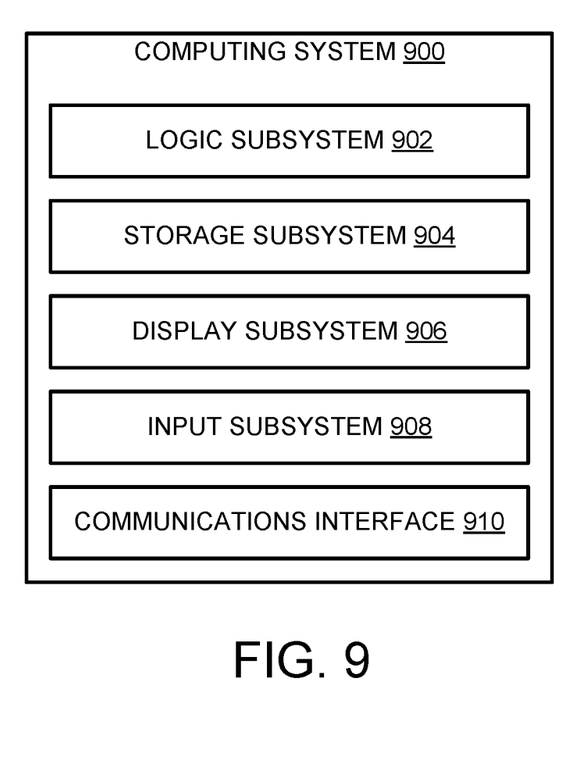
FIG. 9 schematically shows an example computing system.

FIG. 9 schematically shows a simplified representation of a computing system 900 configured to provide any to all of the compute functionality described herein. Computing system 900 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for touch detection comprises: at a touch-sensitive device having a plurality of touch-sensing electrodes, driving a first subset of the plurality of touch-sensing electrodes with a drive signal having a first phase; driving a second subset of the plurality of touch-sensing electrodes with a drive signal having a second phase, different from the first phase; measuring output signals for each of the plurality of touch-sensing electrodes; for each touch-sensing electrode of the plurality of touch-sensing electrodes, determining a complex gradient between the measured output signal for the touch-sensing electrode and the measured output signal for a neighboring touch-sensing electrode, the neighboring touch-sensing electrode driven with a different phase of a drive signal from the touch-sensing electrode; and identifying a location of a touch input relative to the plurality of touch-sensing electrodes based at least in part on magnitudes of the determined complex gradients. In this example or any other example, the first subset of the plurality of touch-sensing electrodes is interleaved with the second subset of the plurality of touch-sensing electrodes. In this example or any other example, the plurality of touch-sensing electrodes are arranged in a two-dimensional electrode grid, and the first subset of the plurality of touch-sensing electrodes is interleaved with the second subset of the plurality of touch-sensing electrodes such that, for a column electrode of the two-dimensional electrode grid driven with the drive signal having the first phase, one or more neighboring column electrodes are driven with the drive signal having the second phase. In this example or any other example, the first phase of the drive signal and the second phase of the drive signal are completely out of phase. In this example or any other example, determining the complex gradients includes applying a Discrete Fourier Transform (DFT) to each of the measured output signals, and for each touch-sensing electrode of the plurality of touch-sensing electrodes, determining the complex gradient between DFT results for the touch-sensing electrode and the neighboring touch-sensing electrode. In this example or any other example, identifying the location of the touch input includes identifying a cluster of touch-sensing electrodes of the plurality of touch-sensing electrodes for which the magnitudes of the complex gradients are greater than a touch input threshold. In this example or any other example, the method further comprises identifying a free touch-sensing electrode of the plurality of touch-sensing electrodes not currently affected by proximity of an input object, and estimating an electrical noise affecting the plurality of touch-sensing electrodes based at least on a measured output signal for the free touch-sensing electrode. In this example or any other example, the method further comprises applying a background noise correction factor to measured output signals for one or more touch-sensing electrodes corresponding to the location of the touch input. In this example or any other example, the free touch-sensing electrode is identified based at least on a complex gradient determined for the free touch-sensing electrode being less than a touch input threshold. In this example or any other example, the touch-sensitive device includes a touch-sensitive display, and the plurality of touch-sensing electrodes are integrated into the touch-sensitive display. In this example or any other example, the plurality of touch-sensing electrodes are integrated into a self-capacitance touch sensor.

In an example, a touch-sensitive device comprises: a plurality of touch-sensing electrodes; and a touch controller configured to: drive a first subset of the plurality of touch-sensing electrodes with a drive signal having a first phase; drive a second subset of the plurality of touch-sensing electrodes with a drive signal having a second phase, different from the first phase; measure output signals for each of the plurality of touch-sensing electrodes; for each touch-sensing electrode of the plurality of touch-sensing electrodes, determine a complex gradient between the measured output signal for the touch-sensing electrode and the measured output signal for a neighboring touch-sensing electrode, the neighboring touch-sensing electrode driven with a different phase of a drive signal from the touch-sensing electrode; and identify a location of a touch input relative to the plurality of touch-sensing electrodes based at least in part on magnitudes of the determined complex gradients. In this example or any other example, the first subset of the plurality of touch-sensing electrodes is interleaved with the second subset of the plurality of touch-sensing electrodes. In this example or any other example, the plurality of touch-sensing electrodes are arranged in a two-dimensional electrode grid, and the first subset of the plurality of touch-sensing electrodes is interleaved with the second subset of the plurality of touch-sensing electrodes such that, for a column electrode of the two-dimensional electrode grid driven with the drive signal having the first phase, one or more neighboring column electrodes are driven with the drive signal having the second phase. In this example or any other example, the first phase of the drive signal and the second phase of the drive signal are completely out of phase. In this example or any other example, determining the complex gradients includes applying a Discrete Fourier Transform (DFT) to each of the measured output signals, and for each touch-sensing electrode of the plurality of touch-sensing electrodes, determining the complex gradient between DFT results for the touch-sensing electrode and the neighboring touch-sensing electrode. In this example or any other example, identifying the location of the touch input includes identifying a cluster of touch-sensing electrodes of the plurality of touch-sensing electrodes for which the magnitudes of the complex gradients are greater than a touch input threshold. In this example or any other example, the touch controller is further configured to apply a background noise correction factor to measured output signals for one or more touch-sensing electrodes corresponding to the location of the touch input. In this example or any other example, the touch-sensitive device further comprises a touch-sensitive display, and wherein the plurality of touch-sensing electrodes are integrated into the touch-sensitive display.

In an example, a method for touch detection comprises: at a touch-sensitive device having a plurality of touch-sensing electrodes, driving a first subset of the plurality of touch-sensing electrodes with a drive signal having a first phase; driving a second subset of the plurality of touch-sensing electrodes with a drive signal having a second phase that is completely out of phase with the first phase, the second subset of the plurality of touch-sensing electrodes interleaved with the first subset of the plurality of touch-sensing electrodes; measuring output signals for each of the plurality of touch-sensing electrodes; applying a Discrete Fourier Transform (DFT) to each of the measured output signals; for each touch-sensing electrode of the plurality of touch-sensing electrodes, determining a complex gradient between DFT results for the touch-sensing electrode and DFT results for a neighboring touch-sensing electrode, the neighboring touch-sensing electrode driven with a different phase of a drive signal from the touch-sensing electrode; and identifying a location of a touch input relative to the plurality of touch-sensing electrodes based at least in part on magnitudes of the determined complex gradients.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for touch detection, the method comprising:
at a touch-sensitive device having a plurality of touch-sensing electrodes, driving a first subset of the plurality of touch-sensing electrodes with a drive signal having a first phase;
driving a second subset of the plurality of touch-sensing electrodes with a drive signal having a second phase, different from the first phase;
measuring output signals for each of the plurality of touch-sensing electrodes;
for each touch-sensing electrode of the plurality of touch-sensing electrodes, determining a complex gradient between the measured output signal for the touch-sensing electrode and the measured output signal for a neighboring touch-sensing electrode, the neighboring touch-sensing electrode driven with a different phase of a drive signal from the touch-sensing electrode; and
identifying a location of a touch input relative to the plurality of touch-sensing electrodes based at least in part on magnitudes of the determined complex gradients.

2. The method of claim 1, wherein the first subset of the plurality of touch-sensing electrodes is interleaved with the second subset of the plurality of touch-sensing electrodes.

3. The method of claim 2, wherein the plurality of touch-sensing electrodes are arranged in a two-dimensional electrode grid, and wherein the first subset of the plurality of touch-sensing electrodes is interleaved with the second subset of the plurality of touch-sensing electrodes such that, for a column electrode of the two-dimensional electrode grid driven with the drive signal having the first phase, one or more neighboring column electrodes are driven with the drive signal having the second phase.

4. The method of claim 1, wherein the first phase of the drive signal and the second phase of the drive signal are completely out of phase.

5. The method of claim 1, wherein determining the complex gradients includes applying a Discrete Fourier Transform (DFT) to each of the measured output signals, and for each touch-sensing electrode of the plurality of touch-sensing electrodes, determining the complex gradient between DFT results for the touch-sensing electrode and the neighboring touch-sensing electrode.

6. The method of claim 1, wherein identifying the location of the touch input includes identifying a cluster of touch-sensing electrodes of the plurality of touch-sensing electrodes for which the magnitudes of the complex gradients are greater than a touch input threshold.

7. The method of claim 1, further comprising identifying a free touch-sensing electrode of the plurality of touch-sensing electrodes not currently affected by proximity of an input object, and estimating an electrical noise affecting the plurality of touch-sensing electrodes based at least on a measured output signal for the free touch-sensing electrode.

8. The method of claim 7, further comprising applying a background noise correction factor to measured output signals for one or more touch-sensing electrodes corresponding to the location of the touch input.

9. The method of claim 7, wherein the free touch-sensing electrode is identified based at least on a complex gradient determined for the free touch-sensing electrode being less than a touch input threshold.

10. The method of claim 1, wherein the touch-sensitive device includes a touch-sensitive display, and the plurality of touch-sensing electrodes are integrated into the touch-sensitive display.

11. The method of claim 1, wherein the plurality of touch-sensing electrodes are integrated into a self-capacitance touch sensor.

12. A touch-sensitive device, comprising:
a plurality of touch-sensing electrodes; and
a touch controller configured to:
drive a first subset of the plurality of touch-sensing electrodes with a drive signal having a first phase;
drive a second subset of the plurality of touch-sensing electrodes with a drive signal having a second phase, different from the first phase;
measure output signals for each of the plurality of touch-sensing electrodes;
for each touch-sensing electrode of the plurality of touch-sensing electrodes, determine a complex gradient between the measured output signal for the touch-sensing electrode and the measured output signal for a neighboring touch-sensing electrode, the neighboring touch-sensing electrode driven with a different phase of a drive signal from the touch-sensing electrode; and
identify a location of a touch input relative to the plurality of touch-sensing electrodes based at least in part on magnitudes of the determined complex gradients.

13. The touch-sensitive device of claim 12, wherein the first subset of the plurality of touch-sensing electrodes is interleaved with the second subset of the plurality of touch-sensing electrodes.

14. The touch-sensitive device of claim 13, wherein the plurality of touch-sensing electrodes are arranged in a two-dimensional electrode grid, and wherein the first subset of the plurality of touch-sensing electrodes is interleaved with the second subset of the plurality of touch-sensing electrodes such that, for a column electrode of the two-dimensional electrode grid driven with the drive signal having the first phase, one or more neighboring column electrodes are driven with the drive signal having the second phase.

15. The touch-sensitive device of claim 12, wherein the first phase of the drive signal and the second phase of the drive signal are completely out of phase.

16. The touch-sensitive device of claim 12, wherein determining the complex gradients includes applying a Discrete Fourier Transform (DFT) to each of the measured output signals, and for each touch-sensing electrode of the plurality of touch-sensing electrodes, determining the complex gradient between DFT results for the touch-sensing electrode and the neighboring touch-sensing electrode.

17. The touch-sensitive device of claim 12, wherein identifying the location of the touch input includes identifying a cluster of touch-sensing electrodes of the plurality of touch-sensing electrodes for which the magnitudes of the complex gradients are greater than a touch input threshold.

18. The touch-sensitive device of claim 12, wherein the touch controller is further configured to apply a background noise correction factor to measured output signals for one or more touch-sensing electrodes corresponding to the location of the touch input.

19. The touch-sensitive device of claim 12, further comprising a touch-sensitive display, and wherein the plurality of touch-sensing electrodes are integrated into the touch-sensitive display.

20. A method for touch detection, the method comprising:
at a touch-sensitive device having a plurality of touch-sensing electrodes, driving a first subset of the plurality of touch-sensing electrodes with a drive signal having a first phase;
driving a second subset of the plurality of touch-sensing electrodes with a drive signal having a second phase that is completely out of phase with the first phase, the second subset of the plurality of touch-sensing electrodes interleaved with the first subset of the plurality of touch-sensing electrodes;
measuring output signals for each of the plurality of touch-sensing electrodes;
applying a Discrete Fourier Transform (DFT) to each of the measured output signals;
for each touch-sensing electrode of the plurality of touch-sensing electrodes, determining a complex gradient between DFT results for the touch-sensing electrode and DFT results for a neighboring touch-sensing electrode, the neighboring touch-sensing electrode driven with a different phase of a drive signal from the touch-sensing electrode; and
identifying a location of a touch input relative to the plurality of touch-sensing electrodes based at least in part on magnitudes of the determined complex gradients.

* * * * *